United States Patent [19]
Nakai

[11] Patent Number: 5,500,809
[45] Date of Patent: Mar. 19, 1996

[54] MICROCOMPUTER SYSTEM PROVIDED WITH MECHANISM FOR CONTROLLING OPERATION OF PROGRAM

[75] Inventor: Toshifumi Nakai, Ichihara, Japan

[73] Assignee: Sharp Kabushiki Kaisha, Osaka, Japan

[21] Appl. No.: 98,904

[22] Filed: Jul. 29, 1993

[30] Foreign Application Priority Data

Aug. 31, 1992 [JP] Japan .................. 4-231651

[51] Int. Cl.$^6$ .................................................. G06F 9/46
[52] U.S. Cl. .................. 364/580; 395/650; 364/242
[58] Field of Search .................. 364/580, 242, 364/270.8, 281.3, 281.8, 941.5, 281; 395/650, 725, 275, 775; 371/16.3, 60, 61, 62

[56] References Cited

U.S. PATENT DOCUMENTS

| | | | |
|---|---|---|---|
| 3,908,099 | 9/1975 | Borbas et al. | 179/175.2 R |
| 3,909,795 | 9/1975 | Chang et al. | 340/172.5 |
| 4,410,938 | 10/1983 | Higashiyama | 364/200 |
| 4,511,961 | 4/1985 | Penton | 364/200 |
| 4,635,258 | 1/1987 | Salowe | 371/16 |
| 4,727,549 | 2/1988 | Tulpule et al. | 371/62 |
| 4,763,296 | 8/1988 | Gercekci | 364/900 |
| 4,805,107 | 2/1989 | Kieckhafer et al. | 364/200 |
| 4,809,280 | 2/1989 | Shonaka | 371/62 |
| 4,811,200 | 3/1989 | Wagner et al. | 364/200 |
| 4,903,193 | 2/1990 | Nakamura | 364/200 |
| 4,954,948 | 9/1990 | Hira et al. | 364/200 |
| 4,982,404 | 1/1991 | Hartman | 371/62 |
| 5,001,666 | 3/1991 | Thompson et al. | 364/900 |
| 5,012,435 | 4/1991 | Bailey et al. | 364/569 |
| 5,073,853 | 12/1991 | Johnson | 395/575 |
| 5,278,976 | 1/1994 | Wu | 395/575 |
| 5,317,745 | 5/1994 | Chan | 395/700 |
| 5,327,362 | 7/1994 | Nomura | 364/580 |
| 5,339,425 | 8/1994 | Vanderah et al. | 395/700 |
| 5,388,254 | 2/1995 | Betz et al. | 395/575 |

FOREIGN PATENT DOCUMENTS

| | | |
|---|---|---|
| 55-92947 | 7/1980 | Japan . |
| 58-161046 | 9/1983 | Japan . |
| 60-3763 | 1/1985 | Japan . |

OTHER PUBLICATIONS

Silberschatz et al., *Operating System Concepts*, pp. 143–145 and p. 105.
Struble, *Assembler Language Programming*, pp. 130–138, 1984.

*Primary Examiner*—Emanuel T. Voeltz
*Assistant Examiner*—Patrick J. Assovad

[57] ABSTRACT

A microcomputer system is provided with a subroutine function. The microcomputer system includes a first timer, a first shifting unit, a second timer and a second shifting unit. The first timer operates to measure an actual execution time of a subroutine. The first shifting unit operates to sense that the measured execution time of the subroutine reaches a predetermined time, to the subroutine if sensed and shift the subroutine to the main routine. The second timer operates to measure an actual execution time of a main routine. The second shifting unit operates to sense that the measured execution time of the main routine reaches a predetermined time, to interrupt the main routine if sensed, and shift the main routine to the subroutine.

11 Claims, 2 Drawing Sheets

MICROCOMPUTER SYSTEM PROVIDED WITH MECHANISM FOR CONTROLLING OPERATION OF PROGRAM

BACKGROUND OF THE INVENTION

1. Field of the Invention

The present invention relates to a microcomputer system which includes a mechanism for controlling an operating sequence of a program.

2. Description of the Related Art

A program configured on a subroutine built in the known microcomputer operates to start a subroutine operation in response to a subroutine instruction or an interrupt instruction or it returns to a main routine in response to a return instruction.

The microcomputer known by the inventors of the present application is arranged to have as main components an arithmetic and logic unit, an accumulator, a program counter, a stack pointer, a stack, a program memory (ROM), a fetch circuit, and an interrupt controller. The program executed by the known microcomputer operates in the sequence of Start, address a, address c, address d, and END. That is, at the Start location, a main routine is executed. At the address a, the subroutine instruction takes place. Then, the operation jumps to the address b to which a jump instruction orders the operation to jump. One or more subroutines are executed from the addresses b to c. At the address c where the return instruction specifies, the operation returns to the address d which the main routine occupies. Then, the main routine is executed until it receives the END instruction.

That is, the data is moved with the center of the program counter PC as follows.

$$PC \leftarrow PC + X (X=1, 2 \ldots)$$

Assuming that SP denotes the stack pointer, STACK denotes the stack, and J denotes a destination address to which the program jumps, If the subroutine call instruction signal CALL or an interrupt instruction signal INT takes place, the operations are executed as follows.

SP ←SP−1

STACK ←PC

PC←J

Since J is entered into the program counter PC, the next program execution is accessed at the address J of the ROM.

A return operation from the known subroutine is executed as follows in response to the return instruction signal RTN given from the subroutine.

PC ←STACK

SP ←SP+1

The address before the subroutine call, saved in the STACK, is returned to the program counter PC. The operation returns to a main routine. These operations are executed in the known program.

In the known program, if a subroutine program is too long, to allow the main routine to make sure of monitoring an event, it is necessary to divide the subroutine program into several short subroutine parts. Thus, the subroutine program is often returning the to the main routine. Further, the program is required to be created in consideration of prediction of a frequency of an event to be monitored and an execution time under the specific condition given by each subroutine. As mentioned above, when creating the subroutine program, it is necessary to take a troublesome step of predicting frequencies of all the event signals used in the system. It means that an event whose frequency is unpredictable or uncertain cannot be built in the program without having to use an interrupt function.

SUMMARY OF THE INVENTION

It is an object of the present invention to provide a microcomputer system which includes a mechanism for easily creating a subroutine program without having to monitor an event by the main routine or to divide a considerably long subroutine program into some parts.

In carrying out the object, a microcomputer system provided with a subroutine function, includes: first measuring means for measuring an actual execution time of a subroutine; means for sensing that the actual execution time of the subroutine measured by the first measuring means reaches a predetermined time, interrupting the execution of the subroutine, and shifting the subroutine execution to execution of a main routine; second measuring means for measuring an actual execution time of the main routine; and means for sensing that the actual execution time of the main routine measured by the second measuring means reaches a predetermined time, interrupting execution of the main routine, and shifting the main routine execution to the subroutine execution.

As mentioned above, therefore, if the subroutine program is too long, it is not necessary to make sure of monitoring an event by the main routine or to divide the long subroutine program into some program parts.

Further objects and advantages of the present invention will be apparent from the following description of the preferred embodiment of the invention as illustrated in the accompanying drawings.

DESCRIPTION OF THE PREFERRED EMBODIMENTS

Later, the description will be oriented to a program configured to a microcomputer system according to an embodiment of the present invention.

Figure 1:
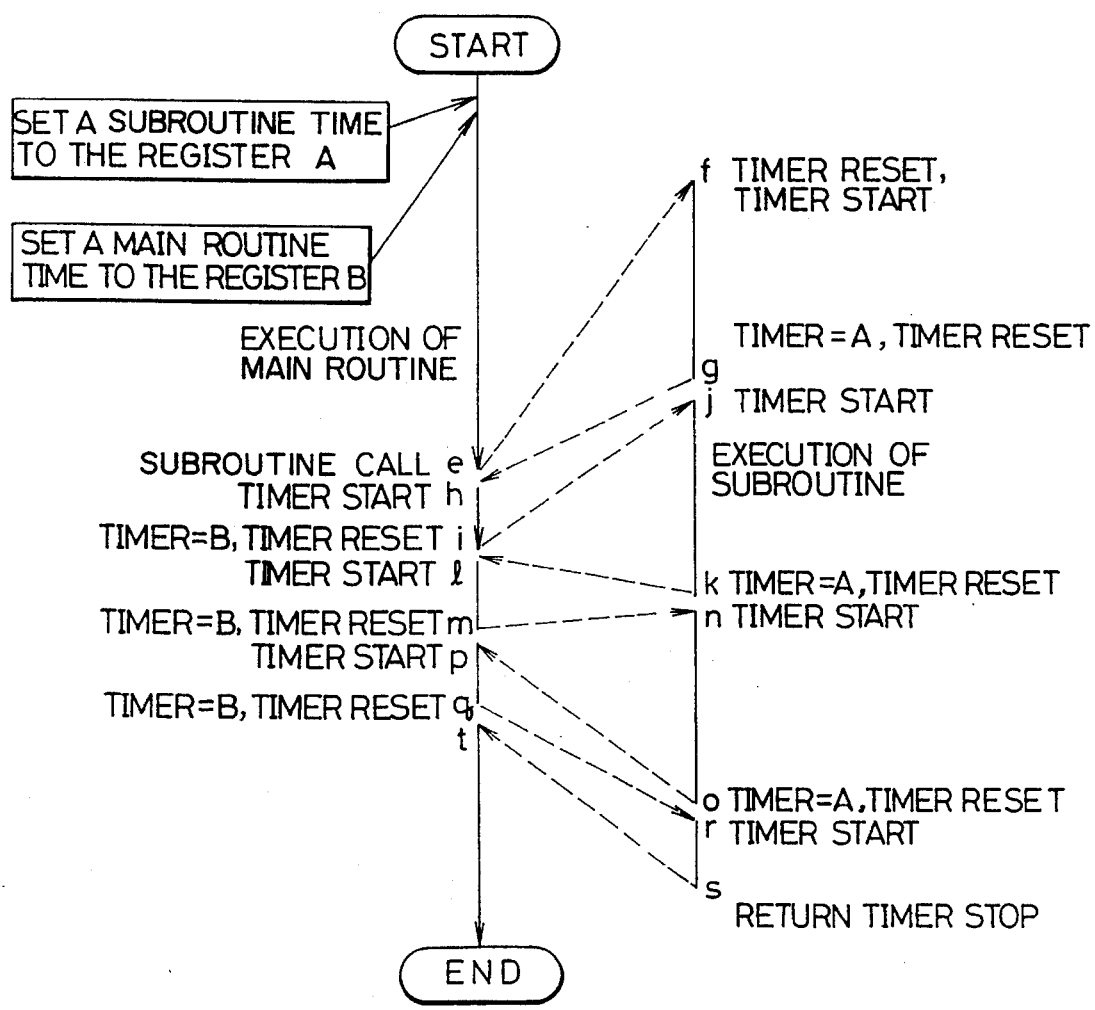
FIG. 1 is a view showing execution of a program in a microcomputer system according to an embodiment of the present invention.
Figure 2:
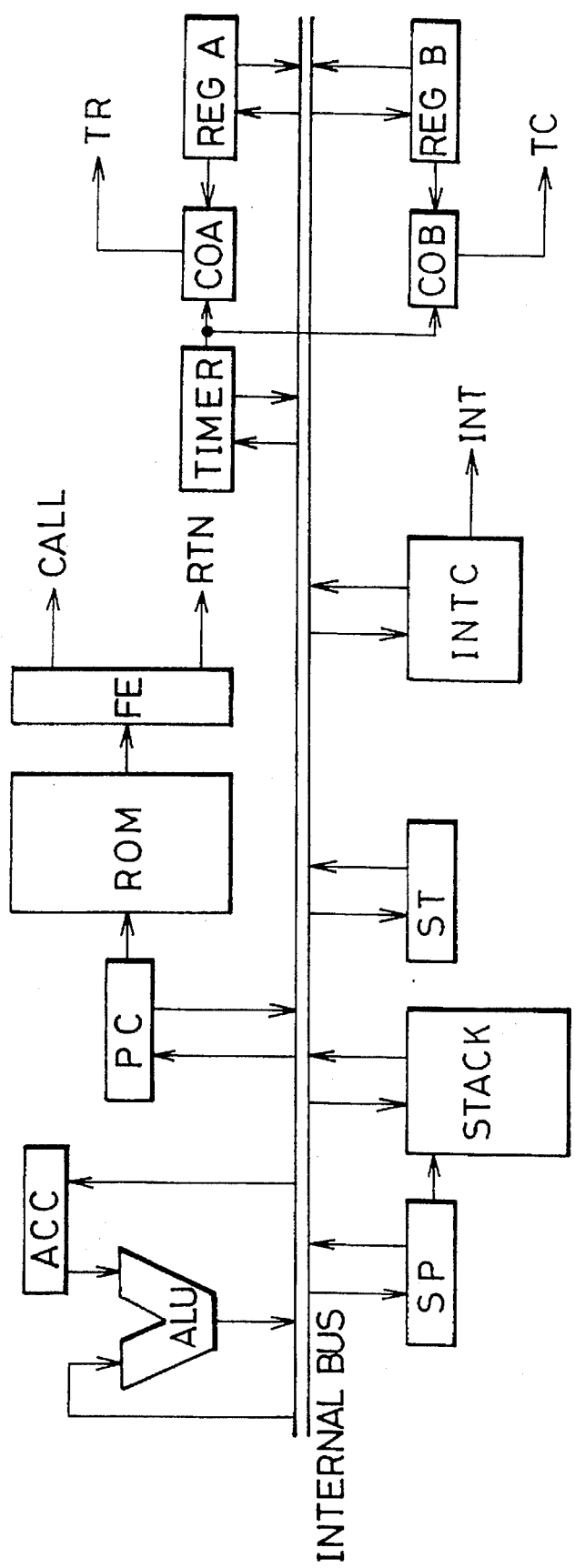
FIG. 2 is a block diagram showing a configuration of the microcomputer system shown in FIG. 1.

FIG. 1 is a view showing a program execution achieved in this embodiment. FIG. 2 is a block diagram showing a configuration of the microcomputer system according to this embodiment. In this block diagram of FIG. 2, ALU denotes an arithmetic and logic unit,; ACC denotes an accumulator,; PC denotes a program counter,; SP denotes a stack pointer,; STACK denotes a stack,; ROM denotes a program memory,; FE denotes a fetch circuit, INTC denotes an interrupt controller,; TIMER denotes a timer for measuring a time; REGA denotes an A register for setting a time for executing the subroutine; REGB denotes a B register for setting a time for executing a main routine, COA denotes a coincidence determining circuit for the TIMER and the REGA and a controller for the coincidence determining circuit, ST denotes a stack used for saving the routine when a jump is done by the timer. The configuration shown in FIG. 2 indicates only main components. In actuality, an address bus, a data bus, a register pointer, registers, a RAM and a data buffer are also provided in the configuration.

In FIG. 1, the program is executed in the sequence of START, e, f, g, h, i, j, k, l, m, n, o, p, q, r, s, t and END. This embodiment of the invention is characterized by timer control of program execution. In this embodiment, the A register REGA and the B register REGB are used for setting a timer control. The main routine is executed at the START. Immediately after the START, the main routine operates to set a time for continuously executing the subroutine in the A register REGA and an execution time for a main routine to be temporarily executed during execution of the subroutine in the B register REGB. The timer TIMER serves to count an actual time. If the coincidence determining circuit and the controller COA determine that the value of the timer TIMER matches to the value set in the A register REGA, a return signal TR for temporarily returning to the main routine is output. In response to the return signal, the program returns to the main routine. When the COB determines that the value counted by the timer TIMER matches to the value set in the B register REGB, a signal TC for returning to the subroutine is output. In response, the program returns to the subroutine.

That is, the main routine is executed, the subroutine call instruction is given at the address e, and the main routine jumps to the destination address f which a jump instruction specifies. At a time when the subroutine operation is started, the timer is reset for starting and is started. When the value of the timer TIMER becomes equal to the value set in the A register REGA, the timer TIMER is reset at the address g and then the operation temporarily returns to the main routine. At the address h, the timer TIMER is started and the main routine is executed. When the value of the timer TIMER becomes equal to the value set in the B register REGB, at the address i, the timer TIMER is reset and the operation jumps to the address j of the subroutine.

The motion of data in each register is performed as follows if a temporary return signal TR indicated by the timer TIMER is issued.

ST ←PC
PC ←STACK
SP ←SP+1 where ST denotes a stack used for saving when a jump operation is done by an indication of the timer TIMER. The program counter is put into ST. Then, the main routine program address is returned from STACK. Further, an operation of returning from the main routine to the subroutine as indicated by the timer TIMER is executed as follows if the subroutine return signal TC is issued.

SP ←SP−1
STACK ←PC
PC ←ST

The program counter is saved in the STACK and the address on the way of executing the subroutine is returned to the program counter.

Similarly, the program is executed in the sequence of j, k, l, m, n, o, p, q, r, s, t and END. Lastly, at the address s, if a return instruction for a subroutine is issued, the timer TIMER is stopped and the operation returns to the address t of the main routine. The main routine is executed until the END.

In addition, by masking the TR signal or TC signal in this embodiment, it is possible to apply this embodiment to the known subroutine system.

Lack of use of this invention may bring about some troubles indicated below.

(1) The system is erroneously operated if a longer time than expected is needed to process the subroutine program, such as multi-level interruption.

(2) If some factor (external factor) causes the program to run away while the subroutine program is being processed, return from the subroutine may be made impossible (if the system has no watch dog timer, for example).

(3) Since a longer time than expected is taken to process the subroutine program, processing of another routine (main routine, for example) is delayed, so that the operating time on the system may be delayed.

To implement the same function as the present invention without using the invention, (1) It is necessary to presume and derive the processing time of any state of the subroutine program.

(2) The subroutine program and the main routine program are required to set a timer interrupt at each necessary time. Further, it is necessary to constantly check a timer interrupt priority and set it to the state. However, the normal microcomputer has difficulty in optionally setting a priority. If possible, when resetting a priority, no interrupt is allowed for preventing erroneous operation. This makes the program very complicated and intricate. Moreover, these processes need the subroutine programs of this invention, which may extend the processing time of the program.

As described above, therefore, the use of the present invention simplifies and reduces the program. The present invention offers a microcomputer system for controlling the program counter with the timer, not a system in which a timer interrupt is executed as a subroutine in the main routine.

Many widely different embodiments of the present invention may be constructed without departing from the spirit and scope of the present invention. It should be understood that the present invention is not limited to the specific embodiments described in the specification, except as defined in the appended claims.

What is claimed is:

1. A microcomputer system provided with a subroutine function, comprising:

first measuring means for measuring an actual execution time of a subroutine;

first detecting means for detecting that the actual execution time of said subroutine measured by said first measuring means reaches a first predetermined time period;

first interrupting means responsive to first detecting means for interrupting the execution of said subroutine following the execution thereof for said first predetermined time period;

first shifting means responsive to first interrupting means for shifting said subroutine execution to execution of a main routine after the interruption of the execution of said subroutine;

monitoring means for monitoring events to be monitored during execution of said main routine;

second measuring means for measuring an actual execution time of said main routine, starting from said shifting to the execution of said main routine;

second detecting means for detecting that the actual execution time of said main routine measured by said second measuring means reaches a second predetermined time period;

second interrupting means responsive to second detecting means for interrupting execution of said main routine following the execution thereof for said second predetermined time period; and second shifting means responsive to second interrupting means for shifting said main routine execution to said subroutine execution following execution of said main routine, wherein execution of a subroutine of said first predetermined time period and execution of said main routine of said second predetermined time period are alternately repeated, unless execution of said subroutine is completed, so that events are monitored by said monitoring means during execution of said main routine.

2. A microcomputer system provided with a subroutine function according to claim 1, wherein said first measuring means includes a timer for counting an actual time.

3. A microcomputer system provided with a subroutine function according to claim 2, wherein said second measuring means includes a timer for counting an actual time.

4. A microcomputer system provided with a subroutine function according to claim 3, further comprising:

first register, holding a value corresponding to the first predetermined time period required for continuously executing the subroutine.

5. A microcomputer system provided with a subroutine function according to claim 4, further comprising second register, holding an execution time period value required for a main routine to be temporarily executed during execution of the subroutine, corresponding to the second predetermined time period.

6. A microcomputer system provided with a subroutine function according to claim 5, further comprising:

a first stack for saving a current address of said subroutine when a jump operation from said subroutine to said main routine is done by an indication of a timer; and a second stack for having a current address of said main routine when a jump operation from said main routine to said subroutine is done.

7. A microcomputer system provided with a subroutine function according to claim 8, wherein said first detecting means includes a first coincidence determining circuit for detecting that a value counted by said timer of said first measuring means matches the value held in said first register and, in response thereto, for outputting a return signal TR for temporarily returning to said main routine.

8. A microcomputer system provided with a subroutine function according to claim 7, wherein said second detecting means includes a second coincidence determining circuit for detecting that a value counted by said timer of said second measuring means matches the value held in said second register and, in response thereto, for outputting a signal TC for returning to said subroutine.

9. A microcomputer system provided with a subroutine function according to claim 8, wherein said first shifting means includes means for putting a value of a program counter into said first stack and for putting a value of said second stack into said program counter.

10. A microcomputer system provided with a subroutine function according to claim 9, wherein said second shifting means includes means for putting a value of the program counter into said second stack and for putting a value of said first stack into said program counter.

11. A microcomputer system provided with a subroutine function according to claim 1, wherein said monitoring means monitors an item to be processed in said main routine.

* * * * *